US005088038A

United States Patent [19]

Tanaka et al.

[11] Patent Number: 5,088,038

[45] Date of Patent: Feb. 11, 1992

[54] MACHINE TRANSLATION SYSTEM AND METHOD OF MACHINE TRANSLATION

[75] Inventors: Katumi Tanaka; Hideki Hirakawa; Hiroyasu Nogami; Shin-ya Amano, all of Kanagawa, Japan

[73] Assignee: Kabushiki Kaisha Toshiba, Kawasaki, Japan

[21] Appl. No.: 527,894

[22] Filed: May 24, 1990

[30] Foreign Application Priority Data

May 24, 1989 [JP] Japan .................................. 1-128722

[51] Int. Cl.[5] .............................................. G06F 15/38

[52] U.S. Cl. ..................................................... 364/419

[58] Field of Search ................................ 364/419, 900

[56] References Cited

U.S. PATENT DOCUMENTS 4,661,924 4/1987 Okamoto ............................ 364/900
4,791,587 12/1988 Doi ..................................... 364/900
4,814,987 5/1989 Miyao et al. ......................... 364/419
4,821,230 4/1989 Kumano ............................. 364/900
4,831,529 5/1989 Mike et al. .......................... 364/419
4,916,614 4/1990 Kaji et al. ........................... 364/419
4,964,044 10/1990 Kumano ............................. 364/419

*Primary Examiner*—Dale M. Shaw
*Assistant Examiner*—Andrew Bodendorf
*Attorney, Agent, or Firm*—Foley & Lardner

[57] ABSTRACT

A machine translation system capable of obtaining a consistent translation for an entire document by taking context into account in translating each word or sentence. In this system, document information necessary to remove uncertainty in the translation due to a presence of a plurality of candidates for the translation is utilized whenever uncertainity due to a presence of a plurality of candidates for the translation arises by attempting to translate according to a translation dictionary containing rules for translation.

10 Claims, 9 Drawing Sheets

FIG.4 (A)

| WORD | PART OF SPEECH | NORMAL FORM | INFLECTION INFORMATION |
|---|---|---|---|
| I | pronoun | I | × |
| wrote | verb | write | past |
| the | determinative | the | × |
| paper | noun | paper | single |
| paper | verb | paper | present |
| in | preposition | in | × |
| this | determinative | this | × |
| this | pronoun | this | × |
| room | noun | room | single |
| room | verb | room | present |

FIG.4 (B)

| WORD | PART OF SPEECH | NORMAL FORM | INFLECTION INFORMATION |
|---|---|---|---|
| I | pronoun | I | × |
| wrote | verb | write | past |
| the | determinative | the | × |
| in | preposition | the | × |

FIG.5
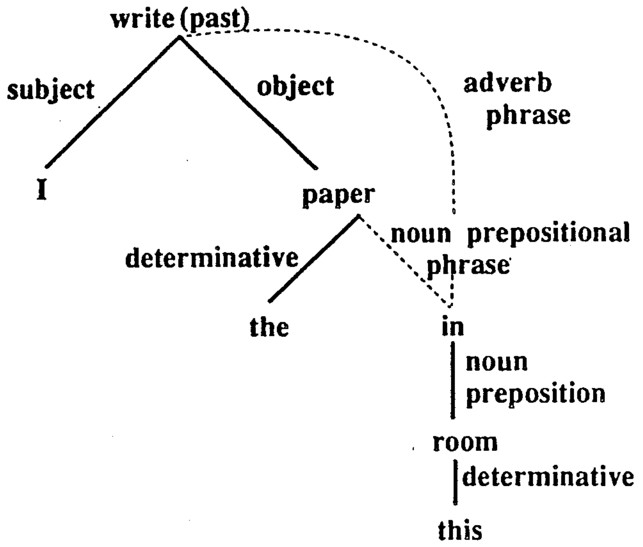
FIG.6
| VERB | CASE | OBJECT |
|---|---|---|
| write | subject | I |
| write | object | paper |
FIG.7
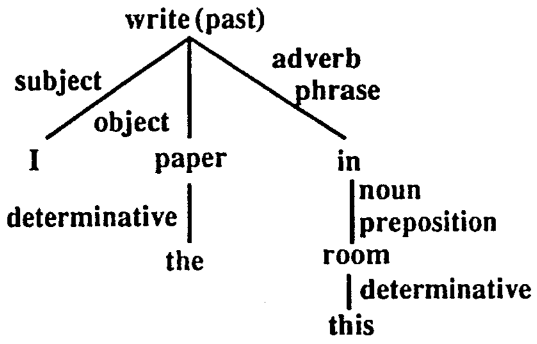
FIG.8
| VERB | CASE | OBJECT |
|---|---|---|
| write | subject | I |
| write | object | paper |
| write | adverb phrase | in |

FIG.9

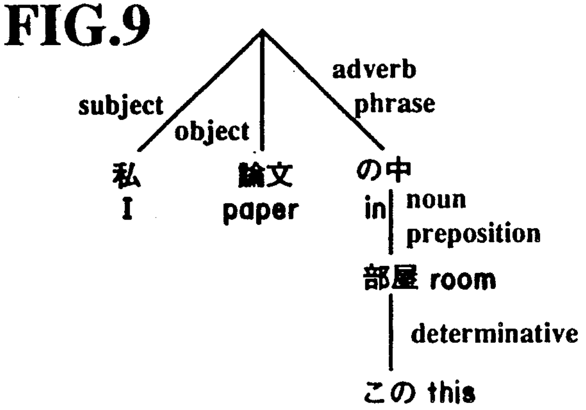

FIG.10

| ENGLISH | | | JAPANESE | |
|---|---|---|---|---|
| OBJECT | CASE | VERB | OBJECT | VERB |
| I | subject | write | 私 I | 書 write |
| paper | object | write | 論文 paper | 書 write |
| in | adverb phrase | write | の中 in | 書 write |

FIG.11

私/は/この/部屋/の中/で/論文/を/書 write
I this room in paper
past

FIG.12

| OBJECT | VERB | CASE | POSTPOSITIONAL WORD |
|---|---|---|---|
| 論文 paper | 書 write | object | を Context Symbol |

FIG.13

I this room in paper wrote
私はこの部屋の中で論文を書いた。
I wrote (a) paper in this room

FIG.14

| VERB | TENSE | INFLECTION | FORM |
|---|---|---|---|
| 書 write | past | termination | 書いた wrote |

FIG.16
| WORD | PART OF SPEECH | NORMAL FORM | INFLECTION INFORMATION |
|---|---|---|---|
| You | pronoun | You | × |
| have | verb | have | present |
| this | determinative | this | × |
| this | pronoun | this | × |
| paper | noun | paper | single |
| paper | verb | paper | present |
| in | preposition | in | × |
| your | determinative | your | × |
| hand | noun | hand | single |
| hand | verb | hand | present |
FIG.17
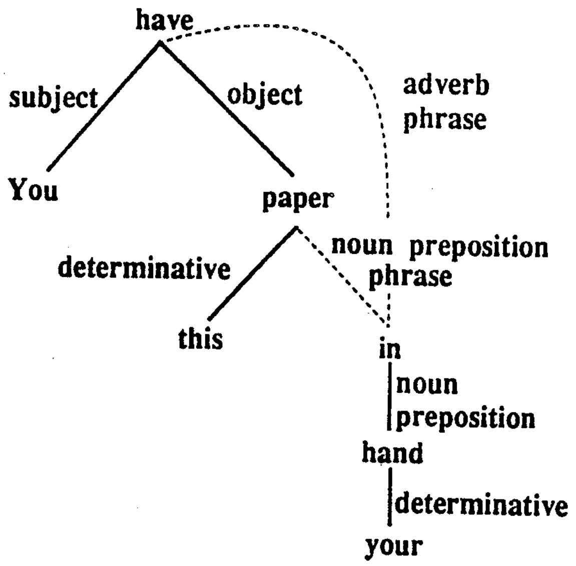
FIG.18
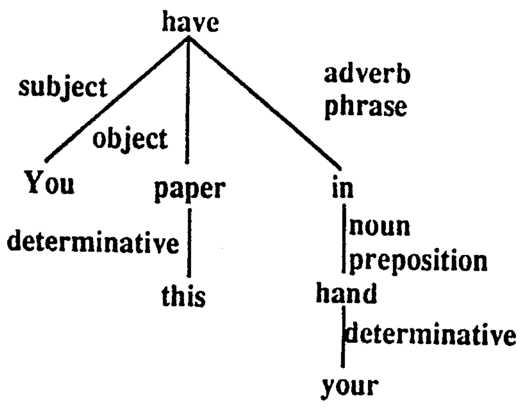

FIG.19 (A)
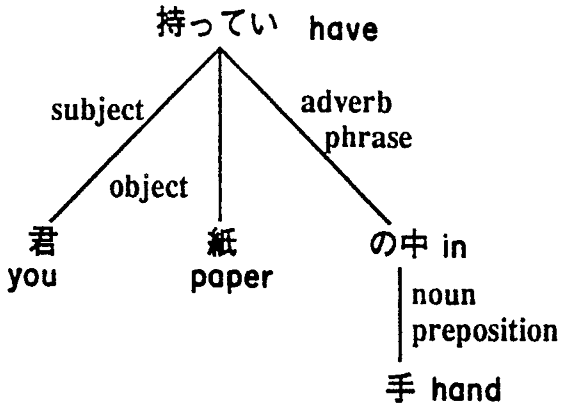
FIG.19 (B)
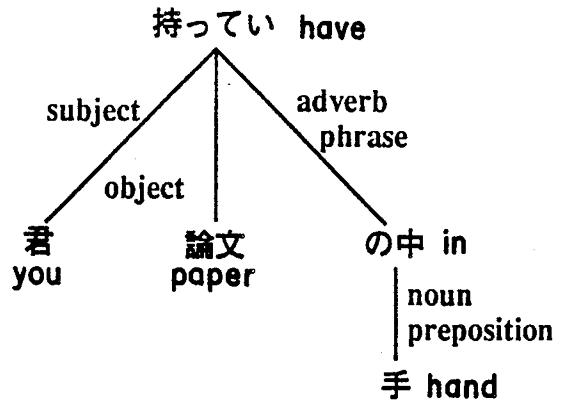
FIG.20
君/は/手/の中/に/論文/を持ってい
you hand in paper have
FIG.21
君は手の中に論文を持っている。
you have (this) paper in (your) hand

MACHINE TRANSLATION SYSTEM AND METHOD OF MACHINE TRANSLATION

BACKGROUND OF THE INVENTION

1. Field of the Invention

The present invention relates to a machine translation system for translating an original document presented in a first language into a translated document in a second language automatically.

2. Description of the Background Art

Generally speaking, a machine translation system obtains a translation in a second language of an original document in a first language by first segmenting the original document into a processing unit such as a word or a phrase by means of a morphological analysis and a syntactic analysis, then a semantic analysis is applied to each processing unit and an appropriate translation for each processing unit is searched through a translation dictionary, and then a proper translated document is obtained by combining the translation of each processing unit according to a prescribed translation grammar.

However, in a conventional machine translation system, it has been difficult to obtain a truly appropriate translation consistently, because of an immaturity of a technique of sentence structure and semantic analysis of a natural language.

Moreover, in general it is preferable to have similar interpretations for similar parts in the same document, but different interpretations for similar parts in the same document have often been obtained conventionally, depending on a context of each part.

For example, in translating an English document containing the following two sentences:

(1) "You have this paper."

(2) "I wrote the paper."

into Japanese, assuming that for a translation of a word "paper" there are two candidates " 紙 " (pronounced "kami", meaning a sheet of a material to write or print on) and " 論文 " (pronounced "ronbun", meaning a dissertation), both of these candidates can be considered appropriate for the sentence (1). However, for the sentence (2), only a candidate "論文 (dissertation)" can be considered appropriate.

For the case of the sentence (2), even conventionally, the proper candidate can be selected for the word "paper" from a requirement of consistency of this word with another word "wrote" in the same sentence. However, conventionally, for the case like that of the sentence (1), a selection of a proper candidate cannot be made from such a requirement of consistency within a sentence itself alone, so that an uncertainty of a translation inevitably arose.

SUMMARY OF THE INVENTION

It is therefore an object of the present invention to provide machine translation system capable of obtaining a consistent translation for an entire document by taking a context into account in translating each word or sentence.

According to one aspect of the present invention there is provided a machine translation system for translating an original document in a first language into a translated document in a second language, comprising: translation dictionary means for storing rules for translation from the first language to the second language; document information memory means for storing a document information necessary to remove uncertainty in the translation due to a presence of a plurality of candidates for the translation; and means for translating the document by using the translation dictionary means and the document information memory means, in which the document information in the document information memory means is utilized whenever uncertainty due to a presence of a plurality of candidates for the translation arises by attempting to translate according to a translation dictionary.

According to another aspect of the present invention there is provided a method of machine translation for translating an original document in a first language into a translated document in a second language, comprising the steps of: preparing rules for translation from the first language to the second language; accumulating a document information necessary to remove uncertainty in the translation due to the presence of a plurality of candidates for the translation; and translating the document by using the rules and the document information, in which the document information is utilized whenever uncertainty due to a presence of a plurality of candidates for the translation arises by attempting to translate according to the rules.

Other features and advantages of the present invention will become apparent from the following description taken in conjunction with the accompanying drawings.

BRIEF DESCRIPTION OF THE DRAWINGS

FIG. 4(A) is a result of a morphological analysis in the first translation process of FIG. 3.

FIG. 4(B) is a morphological information to be memorized in the first translation process of FIG. 3.

FIG. 5 is a result of a syntactic analysis in the first translation process of FIG. 3.

FIG. 6 is a syntactic information to be memorized in the first translation process of FIG. 3.

FIG. 7 is a result of a semantic analysis in the first translation process of FIG. 3.

FIG. 8 is a semantic information to be memorized in the first translation process of FIG. 3.

FIG. 9 is a result of a structural transfer in the first translation process of FIG. 3.

FIG. 10 is a structural transfer information to be memorized in the first translation process of FIG. 3.

FIG. 11 is a result of a syntactic generation in the first translation process of FIG. 3.

FIG. 12 is a syntactic generation information to be memorized in the first translation process of FIG. 3.

FIG. 13 is a result of a morphological generation in the first translation process of FIG. 3.

FIG. 14 is a morphological generation information to be memorized in the first translation process of FIG. 3.

FIG. 16 is a result of a morphological analysis in the second translation process of FIG. 15.

FIG. 17 is a result of a syntactic analysis in the second translation process of FIG. 15.

FIG. 18 is a result of a semantic analysis in the second translation process of FIG. 15.

FIGS. 19*a* and 19*b* are results of a structural transfer in the second translation process of FIG. 15.

FIG. 20 is a result of a syntactic generation in the second translation process of FIG. 15.

FIG. 21 is a result of a morphological generation in the second translation process of FIG. 15.

DETAILED DESCRIPTION OF THE PREFERRED EMBODIMENTS

Figure 1:
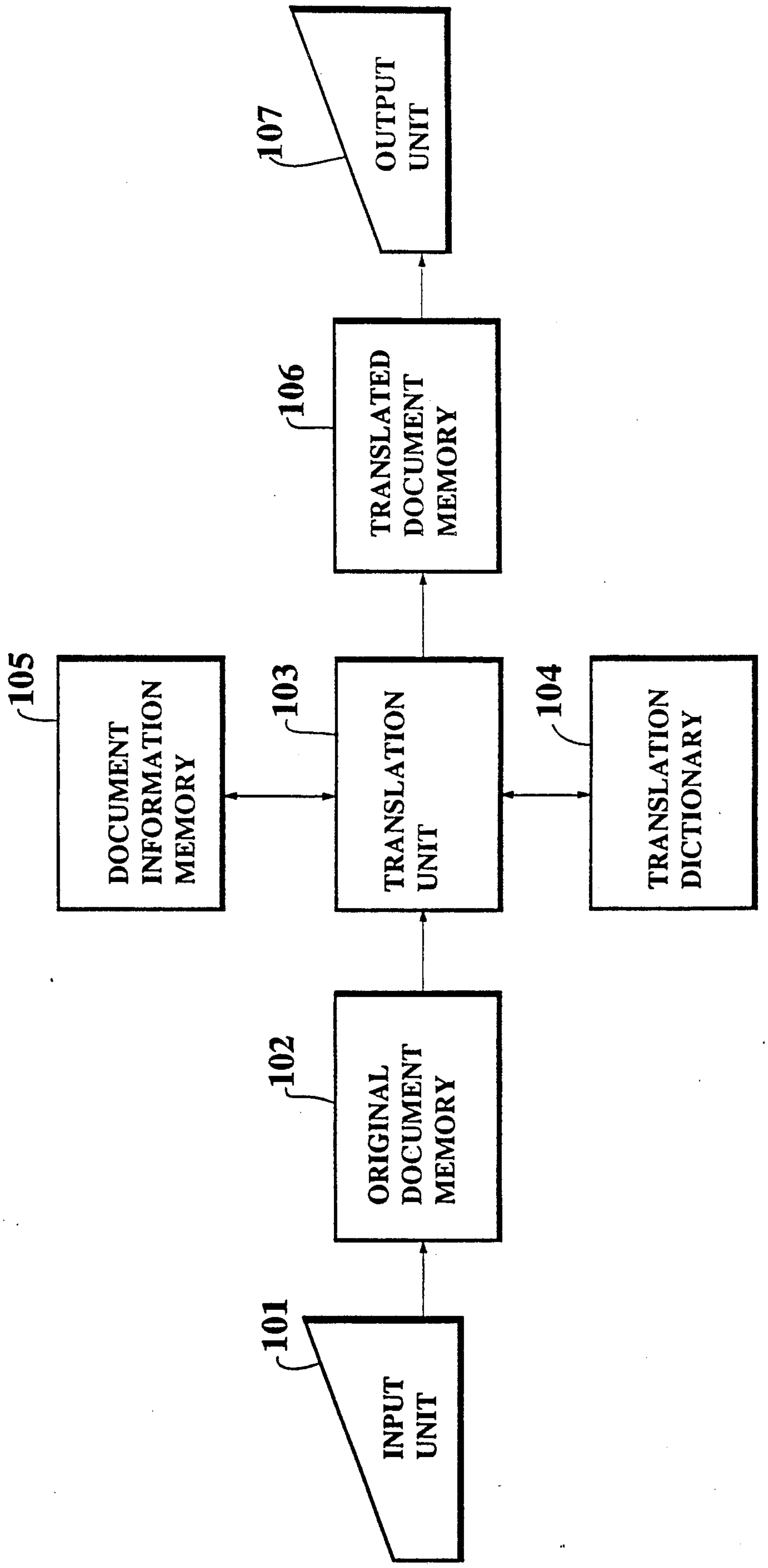
FIG. 1 is a schematic block diagram for one embodiment of a machine translation system according to the present invention.

Referring now to FIG. 1, there is shown one embodiment of a machine translation system according to the present invention, which translates an original document in a first language into a translated document in a second language.

In this embodiment, the machine translation system comprises an input unit 101 such as a keyboard for inputting an original document to be translated, an original document memory 102 for storing the original document entered from the input unit 101, a translation unit 103 for carrying out a translation process on the original document stored in the original document memory 102, a translation dictionary 104 for storing information to be utilized by the translation unit 103 in carrying out the translation process, a document information memory 105 for storing information on the original document and a translated document obtained by the translation unit 103 in a course of the translation process, a translated document memory 106 for storing the translated document obtained by the translation unit 103, and an output unit 107 such as a printer for outputting the translated document stored in the translated document memory 106.

Figure 2:
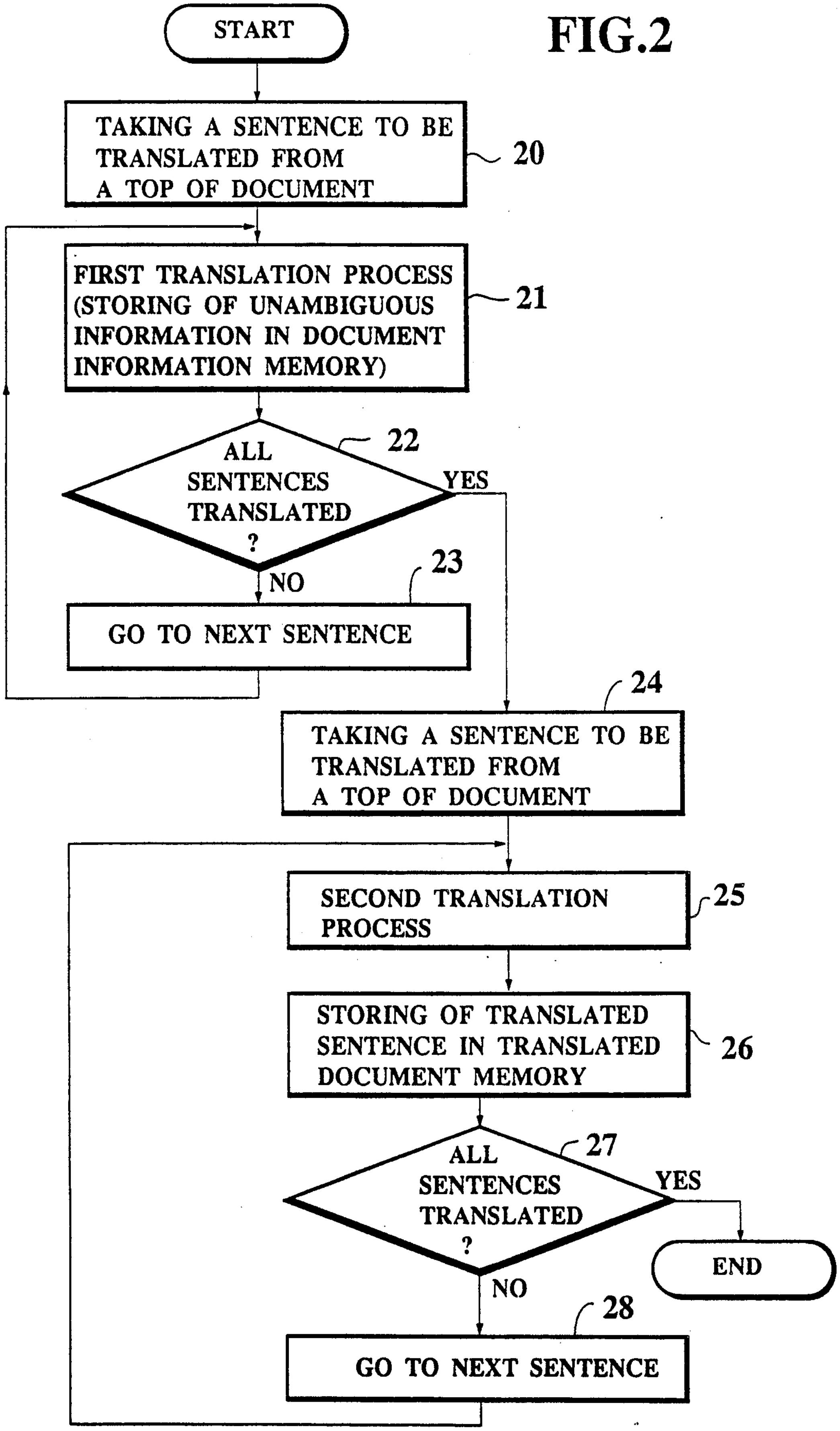
FIG. 2 is a flow chart for an outline of operation by the system of FIG. 1.

In outline, this machine translation system operates according to a flow chart of FIG. 2, as follows.

First, at the step 20, a sentence at a top of the original document is taken out, and at the step 21, a first translation process is carried out with respect to this sentence taken out at the step 20. In this first translation process, as the translation process is carried out by the translation unit 103, a document information on the sentence being translated such as a translation of each word involved in this sentence, a case of each word involved in this sentence and morphological information on this sentence, which has been determined without any uncertainty, is accumulated in the document information memory 105. This will be described in further detail below. Here, however, the result of a translation obtained by the translation unit 103 is not stored in the translated document memory 106. In other words, this first translation process is a preliminary step performed solely for the purpose of accumulating the document information, which will be utilized later in obtaining a final translation result. By the steps 22 and 23, this first translation process at the step 21 is repeated for each sentence in the original document, until all the sentences in the original document go through the first translation process so that the document information on all the sentence of the original document is accumulated in the document information memory 105.

Then, at the step 24, a sentence at a top of the original document is taken out again, and at the step 25, a second translation process is carried out with respect to this sentence taken out at the step 24. In this second translation process, the translation unit 103 utilized the document information accumulated in the document information memory 105 in obtaining the final translation result. This will also be described in further detail below. The final translation result obtained by the translation unit 103 in this second translation process is subsequently stored in the translated sentence memory 106. By the steps 27 and 28, this second translation process at the step 26 is repeated for each sentence in the original document, until all the sentences in the original document go through the second translation process so that the final translation result for the entire document can be obtained at the end.

Now, detail of the operation of the translation unit 103 will be described.

First, referring to FIG. 3, a detail of the operation at the translation unit 103 in the first translation process will be described.

Figure 3:
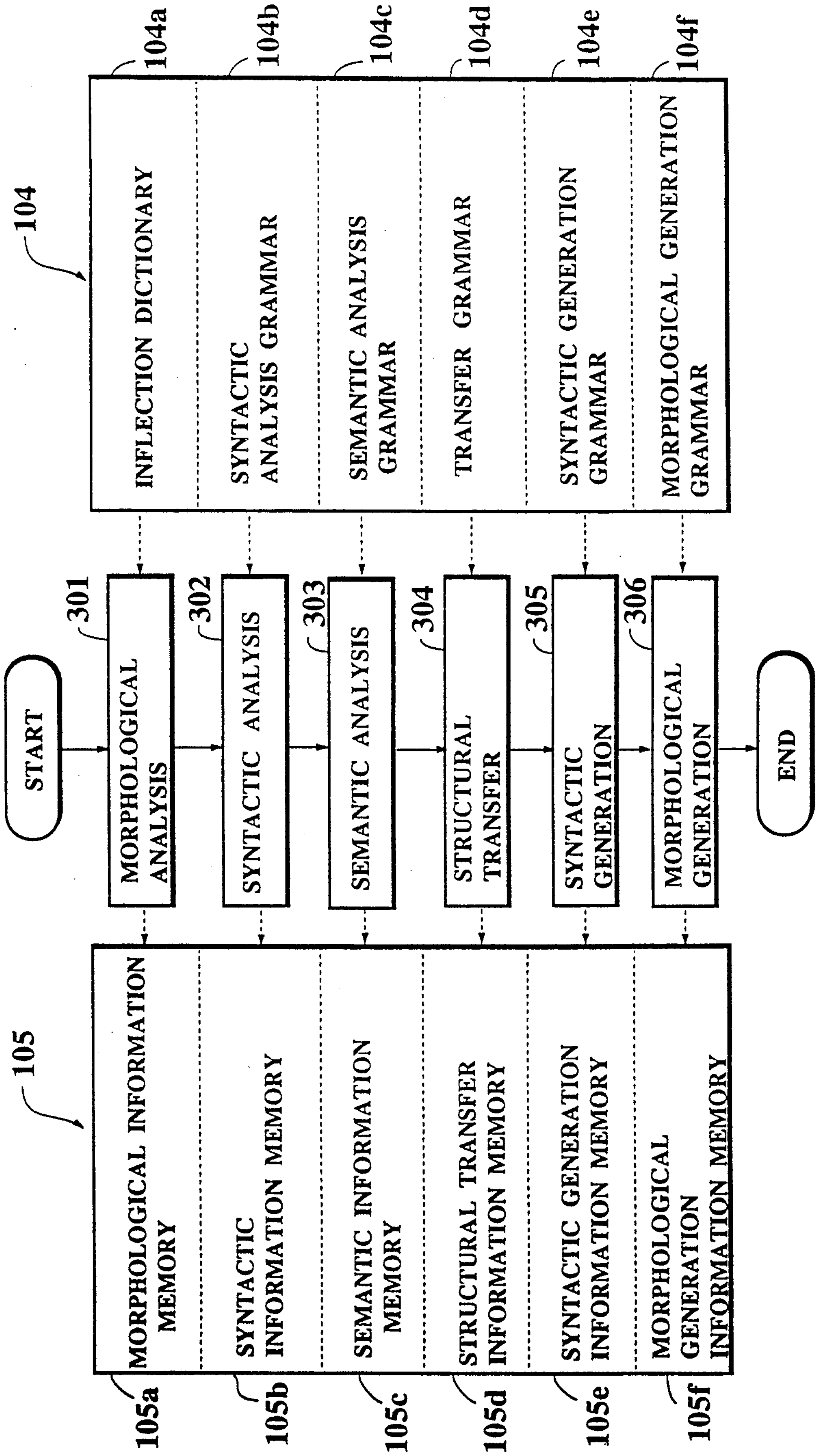
FIG. 3 is a flow chart for a first translation process in the operation by the system of FIG. 1.

As shown in FIG. 3, in this embodiment, the translation dictionary 104 is divided into an inflection dictionary **104*a* containing an information concerning inflection, conjugation, and declension which is necessary for a morphological analysis in the first language, a syntactic analysis grammar 104*b* containing an information necessary for analyzing a sentence structure in the first language, a semantic analysis grammar 104*c* containing the information necessary for analyzing a meaning in a sense of subordination relations among the words and phrases in the first language, a transfer grammar 104*d* containing an information necessary in transforming a sentence from the first language into the second language, a syntactic generation grammar 104*e* containing an information necessary in constructing a sentence structure in the second language, and a morphological generation grammar 104*f*** containing an information necessary for a morphological generation in the second language.

Also, the document information memory 105 is divided into a morphological information memory **105*a*, a syntactic information memory 105*b*, a semantic information memory 105*c*, a structural transfer information memory 105*d*, a syntactic generation information memory 105*e*, and a morphological generation information memory 105*f***.

Now, in the first translation process, first, at the step 301, a morphological analysis in the first language is carried out by utilizing the inflection dictionary **104*a*, in order to determine a part of speech, a normal form, and an inflection information for each word of the sentence in the first language. Those which are determined without any uncertainty by this morphological analysis will be stored in the morphological information memory 105*a*** as a morphological information.

Then, at the step 302, a syntactic analysis in the first language is carried out in accordance with the syntactic analysis grammar **104*b*, in order to obtain a sentence structure among the words of the sentence in the first language. Those parts of the sentence structure which are determined without any uncertainty by this syntactic analysis will be stored in the syntactic information memory 105*b*** as a syntactic information. At this stage, some uncertainties in interpretation of subordination relations in the sentence may be remaining.

Then, at the step 303, a semantic analysis in the first language is carried out in accordance with the semantic analysis grammar **104*c*, in order to remove all the remaining uncertainties in interpretation of subordination relations in the sentence. Any information concerning this interpretation determined without any uncertainty by this semantic analysis will be stored in the semantic information memory 105*c*** as a semantic information.

Then, at the step 304, a structural transfer is carried out in accordance with the transfer grammar 104*d*, in order to convert each word from the first language to the second language. Any information concerning this conversion determined without any uncertainty by this structural transfer will be stored in the structural transfer information memory 105*d* as a structural transfer information.

Then, at the step 305, a syntactic generation is carried out in accordance with the syntactic generation grammar 104*e*, in order to construct a sentence structure in the second language and determine an order of the words of the sentence in the second language. Those parts of the sentence structure in the second language which are determined without any uncertainty by this syntactic generation will be stored in the syntactic generation information memory 105*e* as a syntactic generation information.

Finally, at the step 306, a morphological generation is carried out in accordance with the morphological generation grammar 104*f*, in order to complete the translation by providing proper inflections of the words in the second language. Any information concerning these inflections determined without any uncertainty by this morphological generation will be stored in the morphological generation information memory 105*f* as a morphological information.

The procedure of the first translation process just described will now be illustrated by using an example of a case of translating an English sentence "I wrote the paper in this room." into Japanese.

First, by the morphological analysis, the part of speech, normal form, and inflection information for each word of this sentence is determined as shown in FIG. 4(A). Here, as shown in FIG. 4(A), each of "I", "wrote", "the" and "in" has a single candidate for a translation according to the inflection dictionary 104*a* so that there is no uncertainty, while each of "paper", "this", and "room" has two candidates for a translation according to the inflection dictionary 104*a* so that there remains an uncertainty. Accordingly, the results of the morphological analysis for only "I", "wrote", "the", and "in" are stored in the morphological information memory 105*a*, as shown in FIG. 4(B).

Next, by the syntactic analysis, the sentence structure of this sentence is obtained as shown in FIG. 5. Here, with respect to the verb "wrote", relationships between "I" and "wrote", and "wrote" and "paper", are determined without any uncertainty, while the interpretation of subordination relation of a phrase "in this room" remains uncertain, i.e., it is not certain whether this phrase is subordinate to the verb "wrote" (i.e., wrote in this room) or to the noun "paper" (i.e., paper in this room). Accordingly, only the relationships between "I" and "wrote", and "wrote" and "paper" are stored in the syntactic information memory 105*b*, as shown in FIG. 6.

Next, by the semantic analysis, the uncertainty in the interpretation of subordination relation of a phrase "in this room" is removed from the sentence structure as shown in FIG. 7. A choice of interpretation of this phrase as an adverb phrase rather than a noun prepositional phrase is deduced from the meanings of words "wrote", "paper", "in", and "room". Accordingly, the relationships between "I" and "wrote", "wrote" and "paper", and "wrote" and "in" are stored in the semantic information memory 105*c*, as shown in FIG. 8.

Next, by the structural transfer, each word of this sentence is converted from English into Japanese as shown in FIG. 9, and the structural transfer information as shown in FIG. 10 which is indicating this conversion is stored in the structural transfer information memory 105*d*. Here, no uncertainty is present for the translation of the word "paper" due to the requirement of compatibility with the word "wrote". Namely, in order to be compatible with the verb "wrote", the meaning of the word "paper" here is ascertained to be that of dissertation.

Next, by the syntactic generation, the order of the words in Japanese is determined as shown in FIG. 11, with a postpositional word "を" inserted editorially. Here, no uncertainty for the choice of the postpositional word exists in this example, so that this selection of the postpositional word is stored in the syntactic generation information memory 105*e* as shown in FIG. 12.

Finally, by the morphological generation, the translated sentence in Japanese is completed by providing a proper inflection of termination in a past tense for the Japanese verb "書" as "書いた", so that a Japanese sentence "私はこの部屋で論文を書いた。" shown in FIG. 13 is obtained as a translation for an original English sentence "I wrote the paper in this room.". Accordingly, this choice of the inflection is stored in the morphological generation memory 105*f* as shown in FIG. 14. Here, no uncertainty for the inflection exists in this example.

Thus, as a result of the first translation process, various information without uncertainty about the translation of the document to which the sentence "I wrote the paper in this room" belongs, i.e., those shown in FIGS. 4(B), 6, 8, 10, 12, and 14, are accumulated in the document information memory 105. This information is subsequently utilized in the second translation process for other sentences of the same document, so as to obtain the final translation of the other sentences which is compatible with these information, such that the consistency can be achieved in the final translation of the document.

Figure 15:
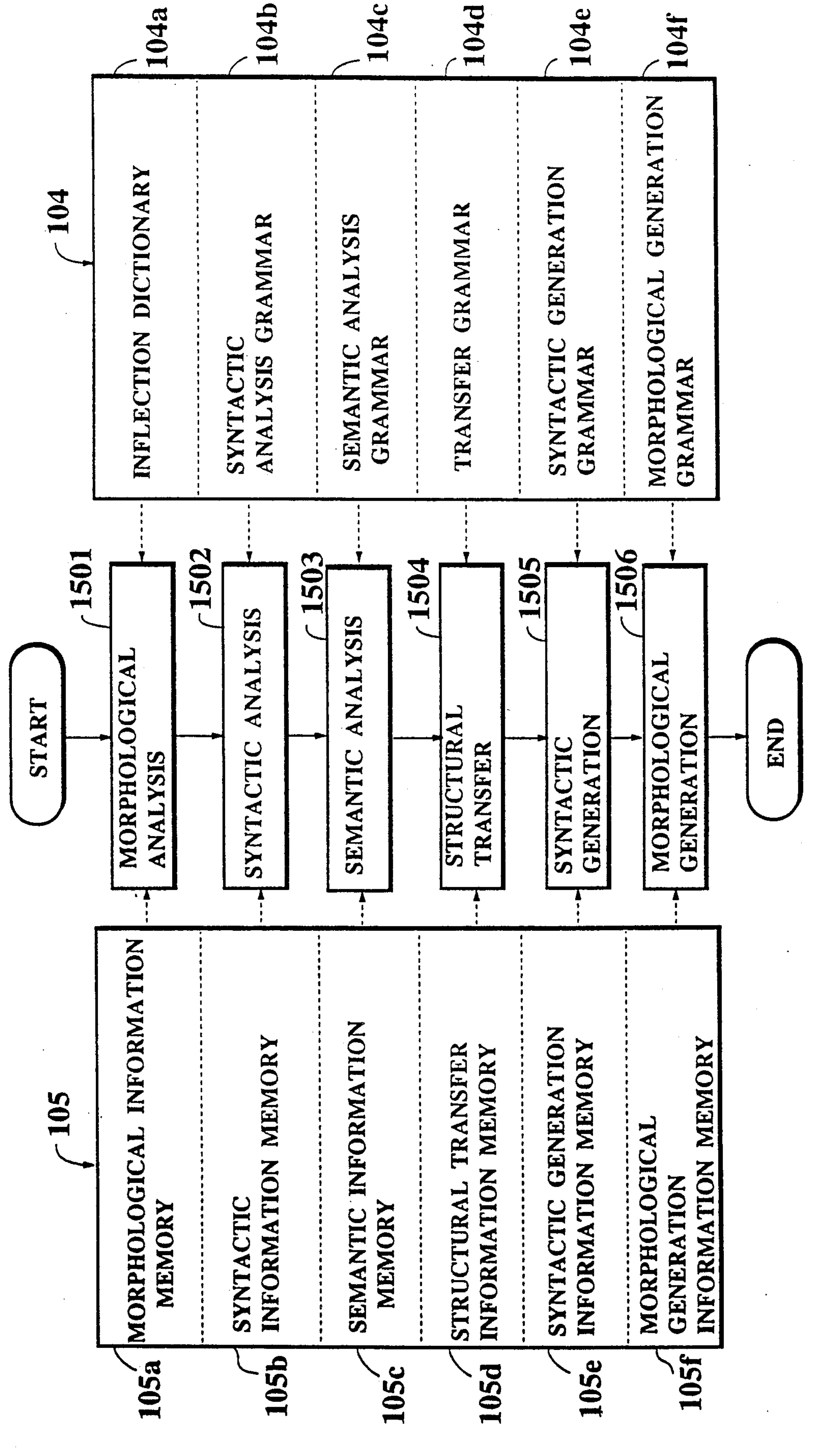
FIG. 15 is a flow chart for a second translation process in the operation by the system of FIG. 1.

Referring now to FIG. 15, a detail of the operation at the translation unit 103 in the second translation process will be described.

In the second translation process, first, at the step 1501, a morphological analysis in the first language is carried out by utilizing the inflection dictionary 104*a* and the morphological information stored in the morphological information memory 105*a*, in order to determine a part of speech, a normal form, and an inflection information for each word of the sentence in the first language.

Then, at the step 1502, a syntactic analysis in the first language is carried out in accordance with the syntactic analysis grammar 104*b* and the syntactic information stored in the syntactic information memory 105*b*, in order to obtain a sentence structure among the words of the sentence in the first language. At this stage, some uncertainties in interpretation of subordination relations in the sentence may be remaining.

Then, at the step 1503, a semantic analysis in the first language is carried out in accordance with the semantic analysis grammar 104*c* and the semantic information stored in the semantic information memory 105*c*, in order to remove all the remaining uncertainties in interpretation of subordination relations in the sentence.

Then, at the step 1504, a structural transfer is carried out in accordance with the transfer grammar 104*d* and the structural transfer information stored in the structural transfer information memory 105_d_, in order to convert each word from the first language to the second language.

Then, at the step 1505, a syntactic generation is carried out in accordance with the syntactic generation grammar 104_e_ and the syntactic generation information stored in the syntactic generation information memory 105_e_, in order to construct a sentence structure in the second language and determine an order of the words of the sentence in the second language.

Finally, at the step 1506, a morphological generation is carried out in accordance with the morphological generation grammar 104_f_ and the morphological generation information stored in the morphological generation information memory 105_f_, in order to complete the translation by proving proper inflections of the words in the second language.

In this second translation process, the document information memory 105 is utilized whenever the uncertainty arises in these steps, as rules for removing such an uncertainty by making a definite selection from a plurality of candidates in accordance with the document information.

The procedure of the second translation process just described will now be illustrated by using an example of a case of translating an English sentence "You have this paper in your hand." into Japanese, under the assumption that it is taking place after the previously described example of the first translation process of a sentence "I wrote the paper in this room.". In other words, those information of FIGS. 4(B), 6, 8, 10, 12, and 14 are assumed to be present in the document information memory 105 at the beginning of this second translation process.

First, by morphological analysis, the part of speech, normal form, and inflection information for each word of this sentence is determined, as shown in FIG. 16. Here, as shown in FIG. 16, each of "You", "have", "in" and "your" has single candidate for a translation according to the inflection dictionary 104_a_ so that there is no uncertainty, while each of "this", "paper", and "hand" has two candidates for a translation according to the inflection dictionary 104_a_ so that there remains an uncertainty. However, since no information on any of "this", "paper", and "hand", exists in the morphological information memory 105_a_, the uncertainty cannot be removed by looking up the document information memory 105. In such a case, the selection is made in accordance with other criteria per-installed in the system. Here, it is assumed that the part of speech of "this" is determined as determinative, and the part of speech of "paper" is determined as noun.

Next, by the syntactic analysis, the sentence structure of this sentence is obtained as shown in FIG. 17. Here, with respect to the verb "have", relationships between "You" and "have", and "have" and "paper", are determined without any uncertainty, while the interpretation of subordination relation of a phrase "in your hand" remains uncertain, i.e., it is not certain whether this phrase is subordinate to the verb "have" (i.e., have in your hand) or the noun "paper" (i.e., paper in your hand). However, since there is no information useful in removing this uncertainty in the syntactic information memory 105_b_, this uncertainty cannot be removed by looking up the document information memory 105.

Next, by the semantic analysis, the uncertainty in the interpretation of subordination relation of a phrase "in your hand" is removed from the sentence structure as shown in FIG. 18. A choice of interpretation of this phrase as an adverb phrase rather than a noun prepositional phrase is deduced from the meanings of words "have", "paper", "in", and "hand".

Next, by the structural transfer, each word of this sentence is converted from English into Japanese. Here, for a translation of a word "paper" there are two candidates "紙" (pronounced "kami", meaning a sheet of a material to write or print on) and "論文" (pronounced "ronbuon", meaning a dissertation), so that there are two possible results as shown in FIGS. 19(A) and 19(B). In order to remove this uncertainty, the document information memory 105 is looked up and the previous use of a translation "論文 (dissertation)" for the same word "paper" can be found in the structural transfer information memory 105_d_. Accordingly, "論文 (dissertation)" is selected as a translation for the word "paper", so that the result of the structural transfer is as shown in FIG. 19(B). In this manner, the consistency concerning the meaning of the word "paper" within the document is achieved.

Next, by the syntactic generation, the order of the words in Japanese is determined as shown in FIG. 20, with a postpositional word "に" inserted editorially. Here, no uncertainty for the choice of the postpositional word exists in this example.

Finally, by the morphological generation, the translated sentence in Japanese is completed by providing a proper inflection of termination in a present tense for the Japanese verb "持ってい" as "持っている", so that a Japanese sentence "君は手の中に論文を持っている。" shown in FIG. 21 is obtained as a translation for an original English sentence "You have this paper in your hand.".

Thus, according to this embodiment, the document information obtained by the first translation process is subsequently utilized in the second translation process as rules for removing some uncertainty arising in the process of translation, so that the consistent translation can be obtained for the sentences of the same document.

It is to be noted that the first translation process may be applied to only a part of the document, instead of an entire document as in the above embodiment.

Also, in the first translation process, only a part of the procedure in FIG. 3 may be carried out, instead of an entire procedure as in the above embodiment.

Also, in the first translation process, those information which has some uncertainty may be stored in the document information memory 105, in addition to those information which has no uncertainty.

Also, in the first translation processes, an information obtained at each step may be stored in any number of any regions of the document information memory 105, instead of those specified in the above embodiment, and in the second translation process, any number of any regions of the document information memory 105 may be looked up, instead of those specified in the above embodiment.

Besides these, many modifications and variations of the above embodiments may be made without departing from the novel and advantageous features of the present invention. Accordingly, all such modifications and variations are intended to be included with the scope of the appended claims.

What is claimed is:

1. A machine translation system for translating an original document in a first language into a translated document in a second language, comprising:

translation dictionary means for storing transformation rules for translating the original document in the first language into the translated document in the second language;

document information memory means for storing a document information indicating a manner to remove an uncertainty of a translation word in the second language corresponding to a particular word in the original document which arises in translating the original document by using the transformation rules stored by the translation dictionary means because of a presence of a plurality of candidates for the translation word; and means for translating the original document by using the transformation rules stored by the translation dictionary means and the document information stored by the document information memory means, in which the document information in the document information memory means is used for removing the uncertainty arising in translating the original document by using the transformation rules stored by the translation dictionary means, where the document information used by the translating means in translating the particular word of the original document is obtained by translating other parts of the original document different from the particular word.

2. The system of claim 1, wherein the document information includes at least one of a morphological information for the original document in the first language, syntactic information for the original document in the first language, a semantic information for the original document in the first language, a structural transfer information for a conversion of the original document from the first language to the second language, a syntactic generation information for the translated document in the second language, and a morphological generation information for the translated document in the second language.

3. The system of claim 1, wherein the document information in the document information memory means is obtained by a previous translation of the original document.

4. The system of claim 3, wherein the translating means translates the original document first by using only the transformation rules stored by the translation dictionary means, in order to obtain the document information, and then the translating means translates the original document using both the transformation rules stored by the translation dictionary means and the document information stored by the document information memory means.

5. The system of claim 4, wherein the document information is an information on those parts of the original document and corresponding parts of the translated document for which no uncertainty arosė when the original document was previously translated by using only the transformation rules stored by the translation dictionary means.

6. A method of machine translation for translating an original document in a first language into a translated document in a second language, comprising the steps of:

providing transformation rules for translating the original document in the first language into the translated document in the second language;

accumulating a document information indicating a manner to remove an uncertainty of a translation word in the second language corresponding to a particular word in the original document which arises in translating the original document by using the transformation rules because of a presence of a plurality of candidates for the translation word; and translating the original document by using the translation rules and the document information, in which the document information is used for removing the uncertainty arising in translating the original document by using the translation rules, where the document information used in the translating the particular word of the original document is obtained by translating other parts of the original document different from the paricular word.

7. The method of claim 6, wherein the document information includes at least one of a morphological information for the original document in the first language, syntactic information for the original document in the first language, a semantic information for the original document in the first language, a structural transfer information for a conversion of the original document from the first language to the second language, a syntactic generation information for the translated document in the second language, and a morphological generation information for the translated document in the second language.

8. The method of claim 6, wherein the document information in the document is obtained by a previous translation of the original document.

9. The method of claim 8, wherein the original document is first translated by using only the translation rules, in order to obtain the document information, and then the original document is translated by using both the translation rules and the document information.

10. The method of claim 9, wherein the document information is an information on those parts of the original document and corresponding parts of the translated document for which no uncertainty arose when the orginal document was previously translated by using only the translation rules.

* * * * *